(12) United States Patent
Baudat

(10) Patent No.: US 7,155,917 B2
(45) Date of Patent: Jan. 2, 2007

(54) APPARATUS AND METHODS FOR CONVERTING A CRYOGENIC FLUID INTO GAS

(75) Inventor: Ned P. Baudat, New Branfels, TX (US)

(73) Assignee: Mustang Engineering L.P. (A Wood Group Company), Houston, TX (US)

( * ) Notice: Subject to any disclaimer, the term of this patent is extended or adjusted under 35 U.S.C. 154(b) by 0 days.

(21) Appl. No.: 10/869,461

(22) Filed: Jun. 15, 2004

(65) Prior Publication Data

US 2005/0274126 A1 Dec. 15, 2005

(51) Int. Cl.
*F17C 9/02* (2006.01)
(52) U.S. Cl. .................................................. 62/50.2
(58) Field of Classification Search ............... 62/50.2
See application file for complete search history.

(56) References Cited

U.S. PATENT DOCUMENTS

| | | | | |
|---|---|---|---|---|
| 3,331,214 A | * | 7/1967 | Proctor et al. ................ | 62/611 |
| 3,570,828 A | * | 3/1971 | Cowan ....................... | 432/223 |
| 3,770,048 A | * | 11/1973 | Linhardt et al. ............ | 165/299 |
| 4,519,213 A | * | 5/1985 | Brigham et al. ............. | 62/50.2 |
| 5,251,452 A | * | 10/1993 | Wieder ....................... | 62/50.2 |
| 6,598,408 B1 | * | 7/2003 | Nierenberg ................. | 62/53.2 |
| 6,622,492 B1 | * | 9/2003 | Eyermann ................... | 62/50.2 |
| 6,644,041 B1 | * | 11/2003 | Eyermann ................... | 62/50.2 |

* cited by examiner

*Primary Examiner*—William C. Doerrler
(74) *Attorney, Agent, or Firm*—Gilbreth Roebuck; J. M (Mark) Gilbreth; Mary A. Gilbreth

(57) ABSTRACT

Method and apparatus for vaporizing cryogenic fluids in which an intermediate heat transfer fluid is first heated across a heat transfer surface with ambient air, and then the heat transfer surface provides heat to vaporize the cryogenic fluid.

7 Claims, 6 Drawing Sheets

| | AMBIENT AIR TEMPERATURE | | | | |
|---|---|---|---|---|---|
| DUTY PERCENTAGE | 85° F | 70° F | 65° F | 45° F | 35° F |
| AIR COOLER | 100 | 100 | 95 | 70 | 58 |
| FIRE HEATER / ECONOMIZER | 0 | 0 | 5 | 30 | 42 |
| TOTAL | 100 | 100 | 100 | 100 | 100 |

Table 1

|  | AMBIENT AIR TEMPERATURE | | | | |
|---|---|---|---|---|---|
| DUTY PERCENTAGE | 85° F | 70° F | 65° F | 45° F | 35° F |
| AIR COOLER | 100 | 100 | 93 | 57 | 47 |
| FIRE HEATER / ECONOMIZER | 0 | 0 | 7 | 43 | 53 |
| TOTAL | 100 | 100 | 100 | 100 | 100 |

*Table 4*

APPARATUS AND METHODS FOR CONVERTING A CRYOGENIC FLUID INTO GAS

BACKGROUND OF THE INVENTION

1. Field of the Invention

The present invention relates to cryogenic fluids. In another aspect, the present invention relates to apparatus and methods for processing, transporting and/or storing cryogenic fluids. In even another aspect, the present invention relates to apparatus and methods for converting a cryogenic fluid into a gas. In even another aspect, the present invention relates to methods and apparatus for processing, transporting and/or storing liquified natural gas ("LNG"). In still another aspect, the present invention relates to apparatus and methods for modifying and/or retrofitting cryogenic vaporization systems.

2. Description of the Related Art

Most conveniently, natural gas is transported via pipeline from the location where it is produced to the location where it is consumed. However, given certain barriers of geography, economics, and/or politics, transportation by pipeline is not always possible, economic or permitted. Without an effective way to transport the natural gas to a location where there is a commercial demand, the gas may be burned as it is produced, which is wasteful.

Liquefaction of the natural gas facilitates storage and transportation of the natural gas (a mixture of hydrocarbons, typically 65 to 99 percent methane, with smaller amounts of ethane, propane and butane). When natural gas is chilled to below its boiling point (in the neighborhood of −260 F depending upon the composition) it becomes an odorless, colorless liquid having a volume which is less than one six hundredth (1/600) of its volume at ambient atmospheric surface temperature and pressure. Thus, it will be appreciated that a 150,000 cubic meter LNG tanker ship is capable of carrying the equivalent of 3.2 billion cubic feet of natural gas.

It is not uncommon for natural gas to be produced in remote locations, such as Algeria, Borneo, or Indonesia, and then liquefied and shipped overseas in this manner to Europe, Japan, or the United States. Typically, the natural gas is gathered through one or more pipelines to a land-based liquefaction facility. The LNG is then loaded onto a tanker equipped with cryogenic compartments (such a tanker may be referred to as an LNG carrier or "LNGC") by pumping it through a relatively short pipeline. After the LNGC reaches the destination port, the LNG is offloaded by cryogenic pump to a land-based regasification facility, where it may be stored in a liquid state or regasified. If regasified, the resulting natural gas then may be distributed through a pipeline system to various locations where it is consumed.

In many circumstances, hot water or steam is used to heat the liquefied gas for vaporization. Unfortunately, such hot water or steam often freezes so as to give rise to the hazard of clogging up the evaporator. Various improvements in this process have heretofore been made. The evaporators presently used are mainly of the open rack type, intermediate fluid type and submerged combustion type.

Open rack type evaporators use sea water as a heat source for the vaporization of liquefied natural gas. These evaporators use once-through seawater flow on the outside of a heat exchanger as the source of heat for the vaporization. They do not block up from freezing water, are easy to operate and maintain, but they are expensive to build. They are widely used in Japan. Their use in the USA and Europe is limited and economically difficult to justify for several reasons. First the present permitting environment does not allow returning the seawater to the sea at a very cold temperature because of environmental concerns for marine life. The present permitting environment allows only a small decrease in temperature before returning the seawater back to the sea, which would require a very large sea water quantity to be pumped through the system, if the terminal vaporization capacity was designed for a commercial size as economics would require. Also coastal waters like those of the southern USA are often not clean and contain a lot of suspended solids, which could require filtration. In addition the sea water intake structure would have to be located far away from the evaporators in most cases because of location restraints or to get to deep and clean sea water at the intake. With these restraints the use of open rack type vaporizers in the USA is environmentally and economically not feasible.

Instead of vaporizing liquefied natural gas by direct heating with water or steam, evaporators of the intermediate fluid type use propane, fluorinated hydrocarbons or like refrigerant having a low freezing point. The refrigerant is heated with hot water or steam first to utilize the evaporation and condensation of the refrigerant for the vaporization of liquefied natural gas. Evaporators of this type are less expensive to build than those of the open rack-type but require heating means, such as a burner, for the preparation of hot water or steam and are therefore costly to operate due to fuel consumption.

Evaporators of the submerged combustion type comprise a tube immersed in water which is heated with a combustion gas injected thereinto from a burner. Like the intermediate fluid type, the evaporators of the submerged combustion type involve a fuel cost and are expensive to operate.

The patent art is replete with a number of patents directed to processes and apparatus for the vaporization of liquefied natural gas.

For example, U.S. Pat. No. 4,170,115, issued on Oct. 9, 1979 to Ooka et al., describes an apparatus for vaporizing liquefied natural gas using estuarine water. This system is arranged in a series of heat exchangers of the indirect heating, intermediate fluid type. A multitubular concurrent heat exchanger is also utilized in conjunction with a multitubular countercurrent heat exchanger. As a result, salt water is used for the vaporization process. U.S. Pat. No. 4,224,802, issued on Sep. 30, 1980 to the same inventor, describes a variation on this type and also uses estuarine water in a multitubular heat exchanger.

U.S. Pat. No. 4,331,129, issued on May 25, 1982 to Hong et al., teaches the utilization of solar energy for LNG vaporization. The solar energy is used for heating a second fluid, such as water. This second fluid is passed into heat exchange relationship with the liquefied natural gas. The water contains a anti-freeze additive so as to prevent freezing of the water during the vaporization process.

U.S. Pat. No. 4,399,660, issued on Aug. 23, 1983 to Vogler, Jr. et al., describes an atmospheric vaporizer suitable for vaporizing cryogenic liquids on a continuous basis. This device employs heat absorbed from the ambient air. At least three substantially vertical passes are piped together. Each pass includes a center tube with a plurality of fins substantially equally spaced around the tube.

U.S. Pat. No. 5,251,452, issued on Oct. 12, 1993 to L. Z. Widder, also discloses an ambient air vaporizer and heater for cryogenic liquids. This apparatus utilizes a plurality of vertically mounted and parallelly connected heat exchange tubes. Each tube has a plurality of external fins and a plurality of internal peripheral passageways symmetrically arranged in fluid communication with a central opening. A solid bar extends within the central opening for a predetermined length of each tube to increase the rate of heat transfer between the cryogenic fluid in its vapor phase and the ambient air. The fluid is raised from its boiling point at the bottom of the tubes to a temperature at the top suitable for manufacturing and other operations.

U.S. Pat. No. 5,819,542, issued on Oct. 13, 1998 to Christiansen et al., teaches a heat exchange device having a first heat exchanger for evaporation of LNG and a second heat exchanger for superheating of gaseous natural gas. The heat exchangers are arranged for heating these fluids by means of a heating medium and having an outlet which is connected to a mixing device for mixing the heated fluids with the corresponding unheated fluids. The heat exchangers comprise a common housing in which they are provided with separate passages for the fluids. The mixing device, constitutes a unit together with the housing and has a single mixing chamber with one single fluid outlet. In separate passages, there are provided valves for the supply of LNG in the housing and in the mixing chamber.

U.S. Pat. No. 6,622,492, issued Sep. 23, 2003, to Eyermann, discloses apparatus and process for vaporizing liquefied natural gas including the extraction of heat from ambient air to heat circulating water. The heat exchange process includes a heat exchanger for the vaporization of liquefied natural gas, a circulating water system, and a water tower extracting heat from the ambient air to heat the circulating water. To make the process work throughout the year the process may be supplemented by a submerged fired heater connected to the water tower basin.

U.S. Pat. No. 6,644,041, issued Nov. 11, 2003 to Eyermann, discloses a process for vaporizing liquefied natural gas including passing water into a water tower so as to elevate a temperature of the water, pumping the elevated temperature water through a first heat exchanger, passing a circulating fluid through the first heat exchanger so as to transfer heat from the elevated temperature water into the circulating fluid, passing the liquefied natural gas into a second heat exchanger, pumping the heated circulating fluid from the first heat exchanger into the second heat exchanger so as to transfer heat from the circulating fluid to the liquefied natural gas, and discharging vaporized natural gas from the second heat exchanger.

In spite of the advancements of the prior art, there is still a need in the art for improved apparatus and methods for processing, transporting, and/or storing LNG.

There is another need in the art for apparatus and methods for converting a liquified cryogenic fluid into a gas.

There is even another need in the art for apparatus and methods for converting a liquified natural gas into gaseous natural gas.

This and other needs in the art will become apparent to those of skill in the art upon review of this specification, including its drawings and claims.

SUMMARY OF THE INVENTION

It is an object of the present invention to provide for improved apparatus and methods for processing, transporting, and/or storing LNG.

It is another object of the present invention to provide for apparatus and methods for converting a liquified cryogenic fluid into a gas.

It is even another object of the present invention to provide for apparatus and methods for converting a liquified natural gas into gaseous natural gas.

This and other objects of the present invention will become apparent to those of skill in the art upon review of this specification, including its drawings and claims.

According to one embodiment of the present invention, there is provided a method of vaporizing a cryogenic fluid. The method includes providing heat from ambient air to a heat transfer fluid across a heat transfer surface, wherein the ambient air and heat transfer fluid are not in direct contact. The method also includes providing heat from the heat transfer fluid to a cryogenic fluid sufficient to vaporize the cryogenic fluid.

According to another embodiment of the present invention, there is provided an apparatus for vaporizing a cryogenic fluid. The apparatus comprises a heat transfer fluid closed circulation loop defined by an ambient air heat exchanger, a heater and a vaporizer; and an LNG flow path defined thru the vaporizer.

According to even another embodiment of the present invention, there is provided a method of modifying a vaporizing system in which a heat transfer fluid is circulated thru a heater to heat up the fluid and then circulated thru a vaporizer to vaporize the cryogenic fluid. The method includes the addition of a ambient air heat exchanger to provide heat to the heat exchange fluid.

According to still another embodiment of the present invention, there is provided a modified system for vaporizing a cryogenic fluid comprising a heat transfer fluid heater and vaporizer, and comprising an ambient air heat exchanger added after the heat transfer fluid heater and vaporizer have been in operation in the system.

These and other embodiments of the present invention will become apparent to those of skill in the art upon review of this specification, including its drawings and claims.

BRIEF DESCRIPTION OF THE DRAWINGS

In the drawings, it should be understood that like reference numbers refer to like members.

DETAILED DESCRIPTION OF THE INVENTION

Figure 1:
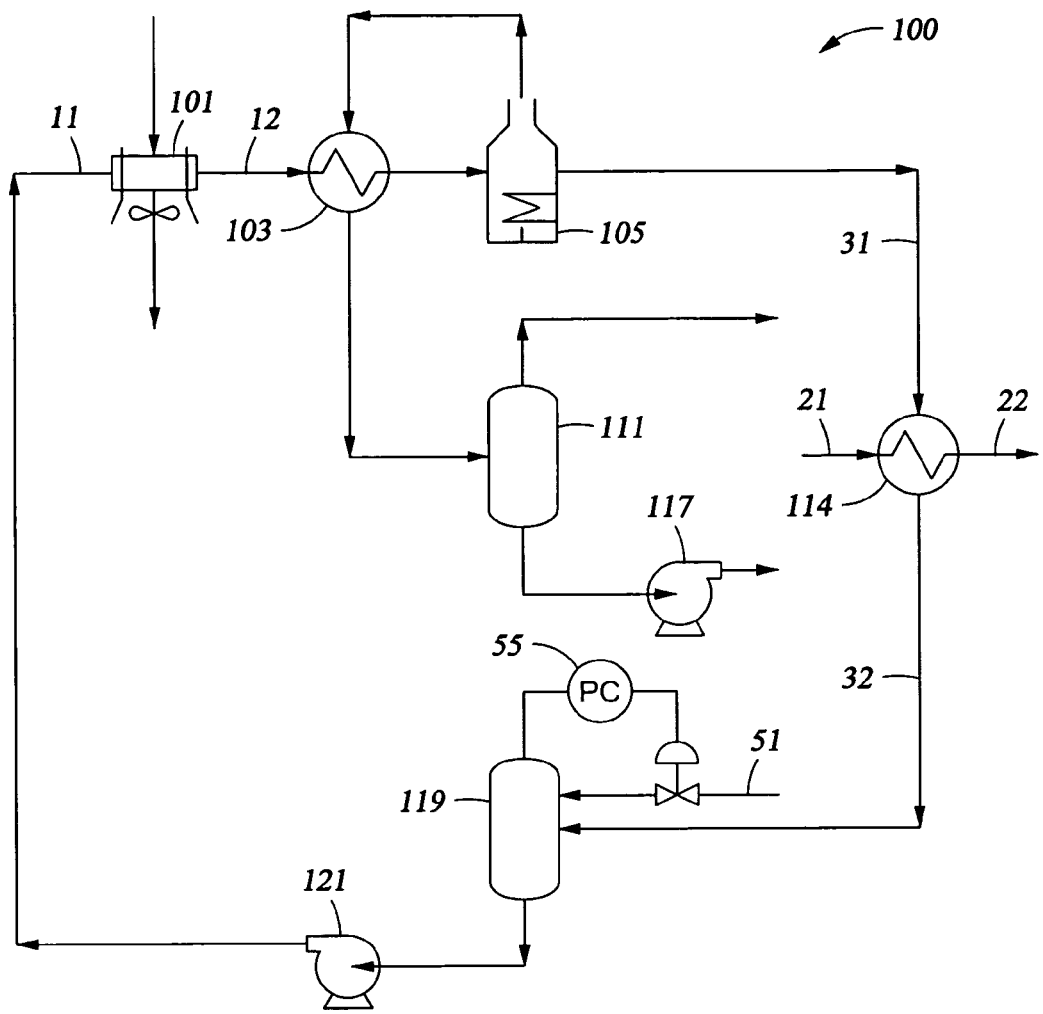
FIG. 1 is a process flow schematic showing regasification system 100 having air exchange pre-heater 101, economizer 103, heater 105, water knockout 111, vaporizer 114, produced water pump 117, circulating fluid surge tank 119, and circulating fluid pump 121.

While some descriptions of the present invention may make reference to liquified natural gas ("LNG"), it should be understood that the present invention is not limited to utility with LNG, but rather has broad utility with cryogenic fluids in general, preferably cryogenic fluids formed from flammable gases.

The apparatus of the present invention will find utility for processing, storing, and/or transporting (i.e., including but not limited to, receiving, dispensing, distributing, moving) cryogenic fluids, a non-limiting example of which is liquified natural gas ("LNG"). More specifically, the present invention provides apparatus and methods for converting a cryogenic fluid into a gas, which apparatus and methods may be used not along in a stand alone manner, but which may also be utilized with and/or incorporated into apparatus and methods for processing, storing, and/or transporting cryogenic fluids.

According to the present invention, there is an unexpected advantage obtained using a standard air cooler as a heater while passing a fluid through the tubes to pick up heat from the air, preferable on a continuous basis. While ambient vaporizers have been used to heat LNG, but require alternating between a number of units as they freeze up from water vapor in the air. The present invention employs an intermediate heat transfer fluid and selected temperatures, wherein frost does not inhibit the transfer surface, to vaporize LNG.

A first non-limiting embodiment of the apparatus and methods of the present invention is best described by reference to FIG. 1, a process flow schematic showing regasification system 100 having air exchange pre-heater 101, economizer 103, heater 105, water knockout 111, vaporizer 114, produced water pump 117, circulating fluid surge tank 119, and circulating fluid pump 121.

LNG is provided to vaporizer 114 via piping 21 at around −252 F, and exits vaporizer 114 via piping 22 as gaseous natural gas at about 40F. A circulating heat transfer fluid is provided to vaporizer 114 via piping 31, and exits vaporizer 114 via piping 32 as a cooled heat transfer fluid.

Heat transfer fluids suitable for use in the present invention include hydrocarbons, non-limiting examples of which include propane and butane, ammonia, glycol-water mixtures, formate-water mixtures, methanol, propanol, and other suitable heat transfer fluids as may be useful under the operating conditions.

The heat transfer fluid is circulated in a closed system through air exchange pre-heater 101 where it is first heated after being cooled in vaporizer 114, then through economizer 103/heater 105 where it may be further heated if necessary, then through vaporizer 114 where it is utilized to provide heat of vaporization to the LNG, before returning to pre-heater 101. This heat transfer circulation system may be provided with one or more surge tanks 119 as necessary. Circulation of the heat transfer fluid is maintained by one or more circulation pumps 121. A nitrogen line 51 and pressure controller 55 maintain pressure of the heat transfer circulation system as desired.

In the practice of the present invention, heat is provided from ambient air to the heat transfer fluid across a heat transfer surface rather than by direct contact between the ambient air and heat transfer fluid. For example, the heat transfer fluid is passed through the tubes of a heat exchanger while the ambient air passes through the shell side.

Under certain conditions (see Examples 1, 2 and 3 below), ambient air will provide all of the heating necessary without the need for the economizer 103/heater 105 providing any heating duty.

When heater 105 is necessary it will be most efficiently run in conjunction with economizer 103, in which the exit effluent from heater 105 routed to economizer 103 to heat the LNG or other cryogenic fluid. The cooled effluent exits economizer 103 and flows to water knockout tank 111. Pump 117 eliminates produced water from the system.

A second non-limiting embodiment of the apparatus and methods of the present invention is best described by reference to FIG. 2, which is a process flow schematic showing regasification system 200 having tube-in-tube air exchanger 201, economizer 203, vaporizer 214, produced water knockout 211, produced water pump 217, warming medium accumulator 219 and warming medium pump 221.

In this embodiment, heat exchanger 201 is a tube-in-tube air exchanger (i.e, two tubes arranged in a concentric fashion), in which the cryogenic fluid passes through the inner most tube, pump 221 circulates the heat transfer fluid through the annular space between the two tubes, and ambient air passes over the surface of the outer tube. Accumulator 219 provides volume to the system to aid in heat transfer. For those times when the ambient air is too cool, extra heating may be provided by heater 214/economizer 203. Hot exit effluent from heater 214 routed to economizer 203 to heat the LNG or other cryogenic fluid. The cooled effluent exits economizer 203 and flows to water knockout tank 211. Pump 217 eliminates produced water from the system.

The methods and apparatus of the present invention also provide for retrofitting of pre-existing cryogenic regassification apparatus.

In its simplest aspect, regassification which involves closed loop circulation of a heat transfer fluid thru a heater and then into a vaporizer to heat and vaporize a cryogenic fluid, may be modified by placing an ambient air heat exchanger ahead of the heater to either pre-heat or fully heat the heat transfer fluid. Of course, there will not be direct contact of the heat transfer fluid with the ambient air, but rather indirect contact across a heat transfer service.

Figure 3:
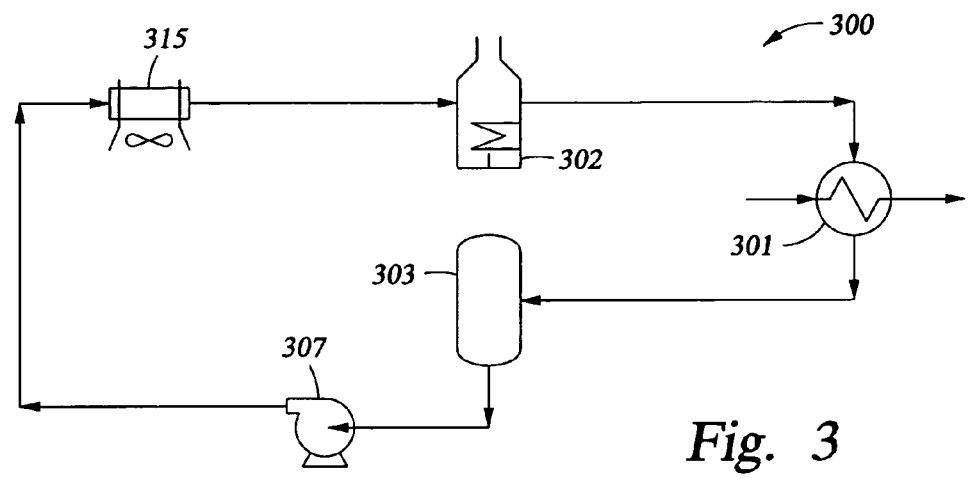
FIGS. 3 and 4 are schematics showing a retrofit of a typical ethylene glycol LNG vaporization system 300 having heater 302, LNG vaporizer 301, accumulator 303, and circulation pump 307.

For example, referring now to FIG. 3, there is shown a retrofit of a typical ethylene glycol LNG vaporization system 300 having heater 302, LNG vaporizer 301, accumulator 303, and circulation pump 307. In a method of retrofitting/modifying the system to form a retrofitted/modified system, air pre-heater 315 is added just upstream of heater 302 to serve as a pre-heater and/or heater.

Figure 6:
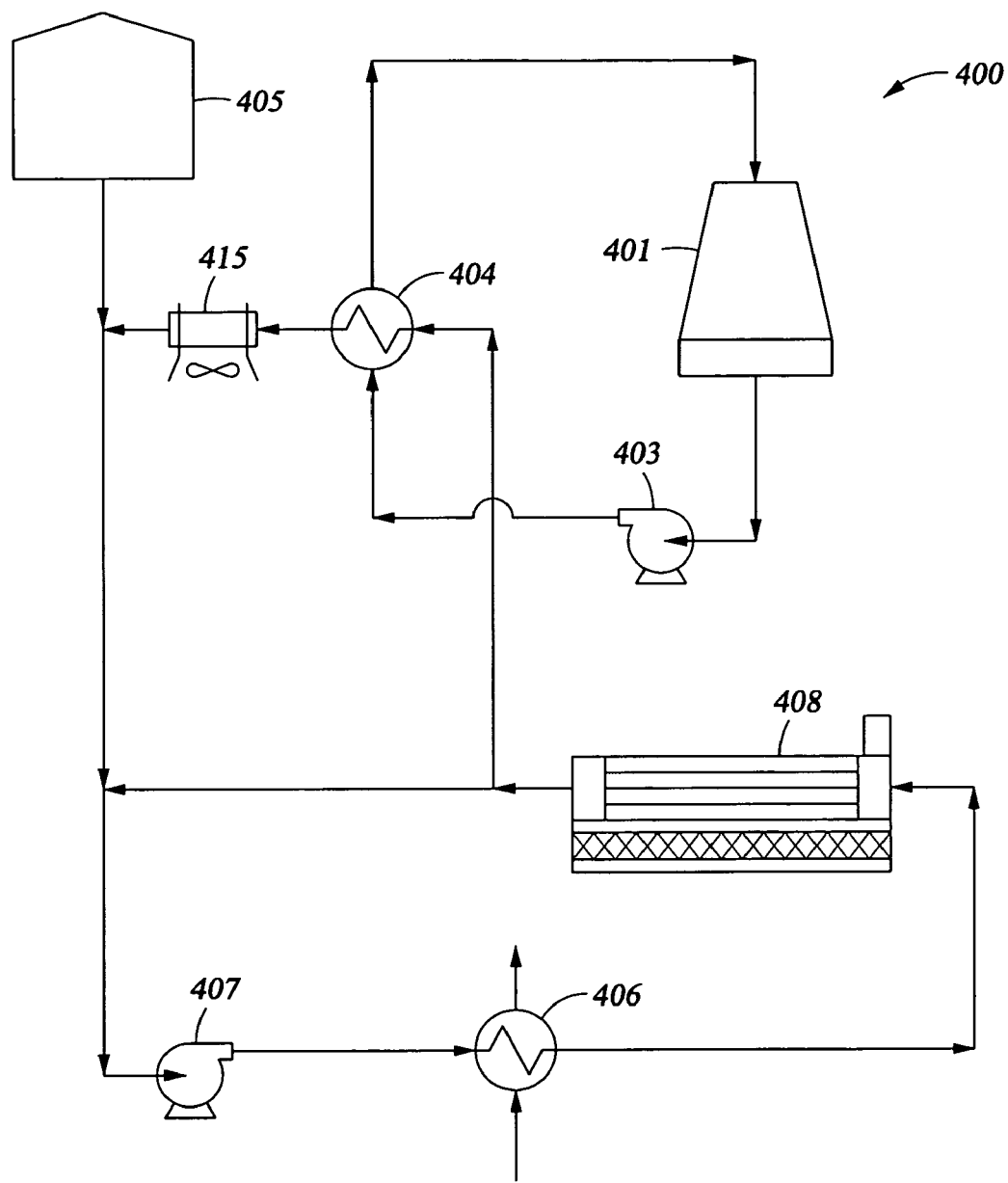
FIGS. 6 and 7 are schematics showing a retrofit of a typical cooling tower vaporization system 400, having cooling tower 401, pump 403, exchanger 404, tank 405, LNG vaporizer 406, pump 407 and submerged bath heater 408.

Referring now to FIG. 6, there is shown a retrofit of a typical cooling tower vaporization system 400, having cooling tower 401, pump 403, exchanger 404, tank 405, LNG vaporizer 406, pump 407 and submerged bath heater 408. In a method of retrofitting/modifying the system to form a retrofitted/modified system, air pre-heater 415 is added. However, instead of preheating the LNG, this heater 415 serves to heat the heat transfer fluid flowing through vaporizer 406.

More complex modification/retrofitting of such existing systems involve taking a side stream of the cryogenic fluid and routing it thru a vaporizer in which the vaporizer heat transfer fluid has been heated by ambient air in the manner of the present invention. Essentially, such a retrofit is the addition of the apparatus and method of the present invention to handle at least a portion of the vaporization.

Figure 4:
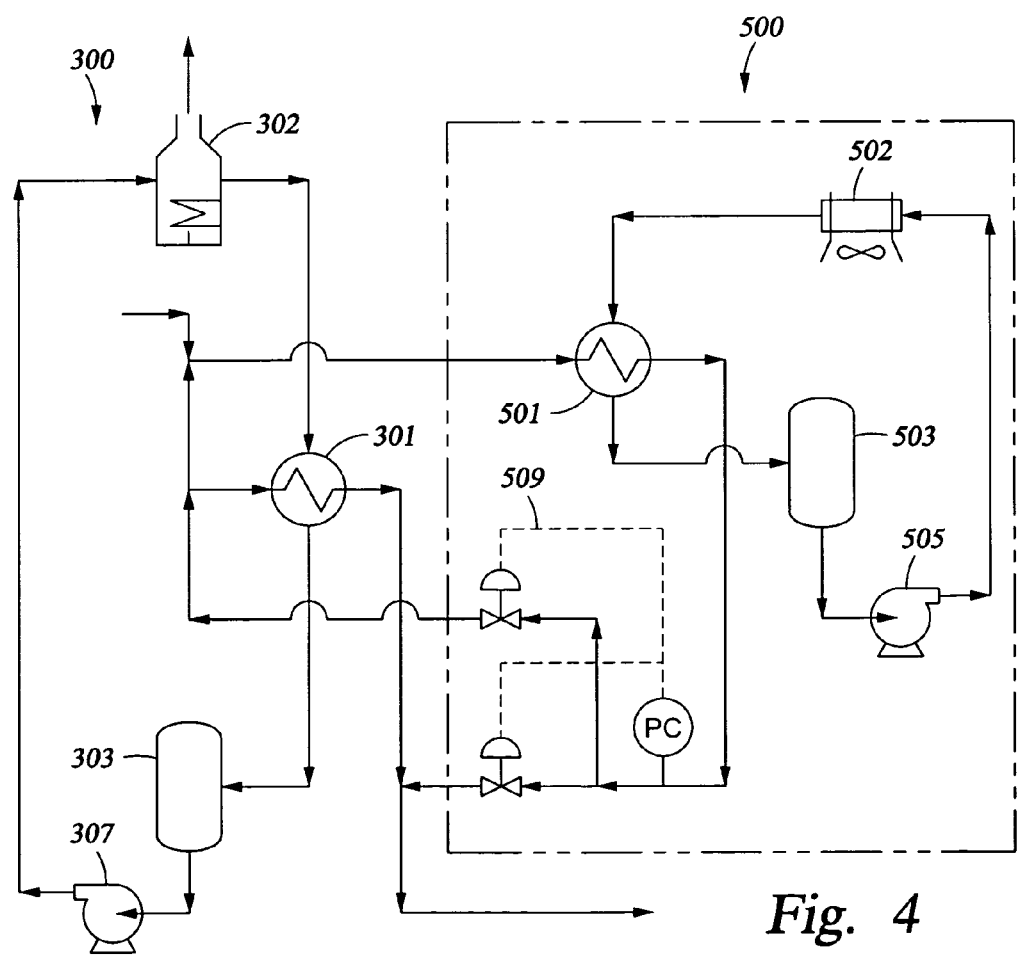

For example, the typical ethylene glycol/water system shown in FIG. 3 and modified/retrofitted by the addition of air pre-heater 315, may instead be modified/retrofitted as shown in FIG. 4 by the addition of system 500 in which a heat transfer fluid is circulated in a closed circuit via pump 505 through air heater 502 where it is heated, through exchanger 501 where it heats LNG, through accumulator 503, and back to heater 502 to complete the circuit. Controller 509 regulates flow of LNG to the pipeline and/or back to the LNG Vaporizer.

Figure 7:
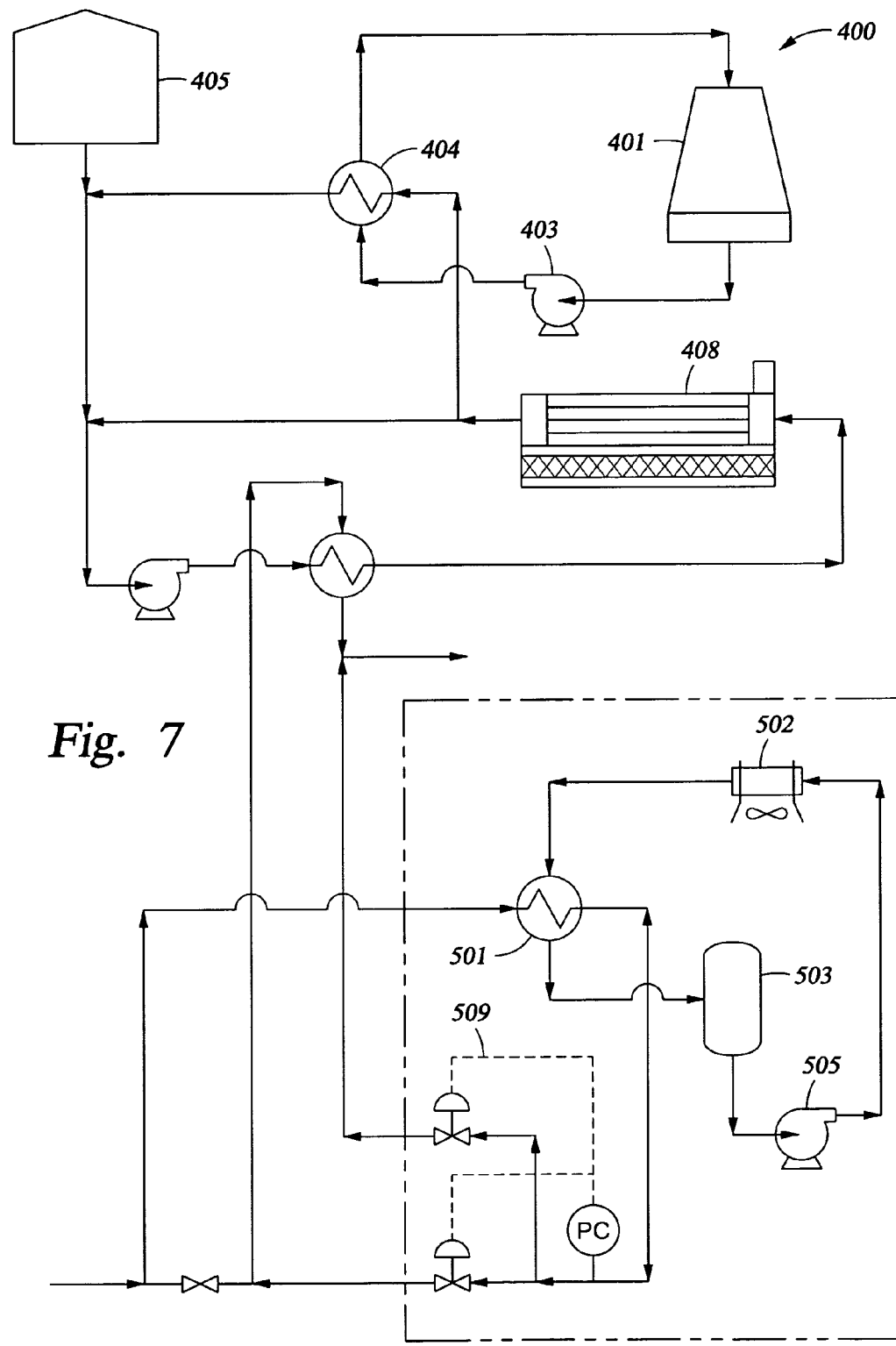

As another example, the typical cooling tower vaporization system shown in FIG. 6 and modified/retrofitted by the addition of air exchanger 415, may instead be modified/retrofitted as shown in FIG. 7 by the addition of system 500 in which a heat transfer fluid is circulated in a closed circuit via pump 505 through air heater 502 where it is heated, through exchanger 501 where it heats LNG, through accumulator 503, and back to heater 502 to complete the circuit. Controller 509 regulates flow of LNG to the pipeline and/or back to the LNG Vaporizer.

Figure 5:
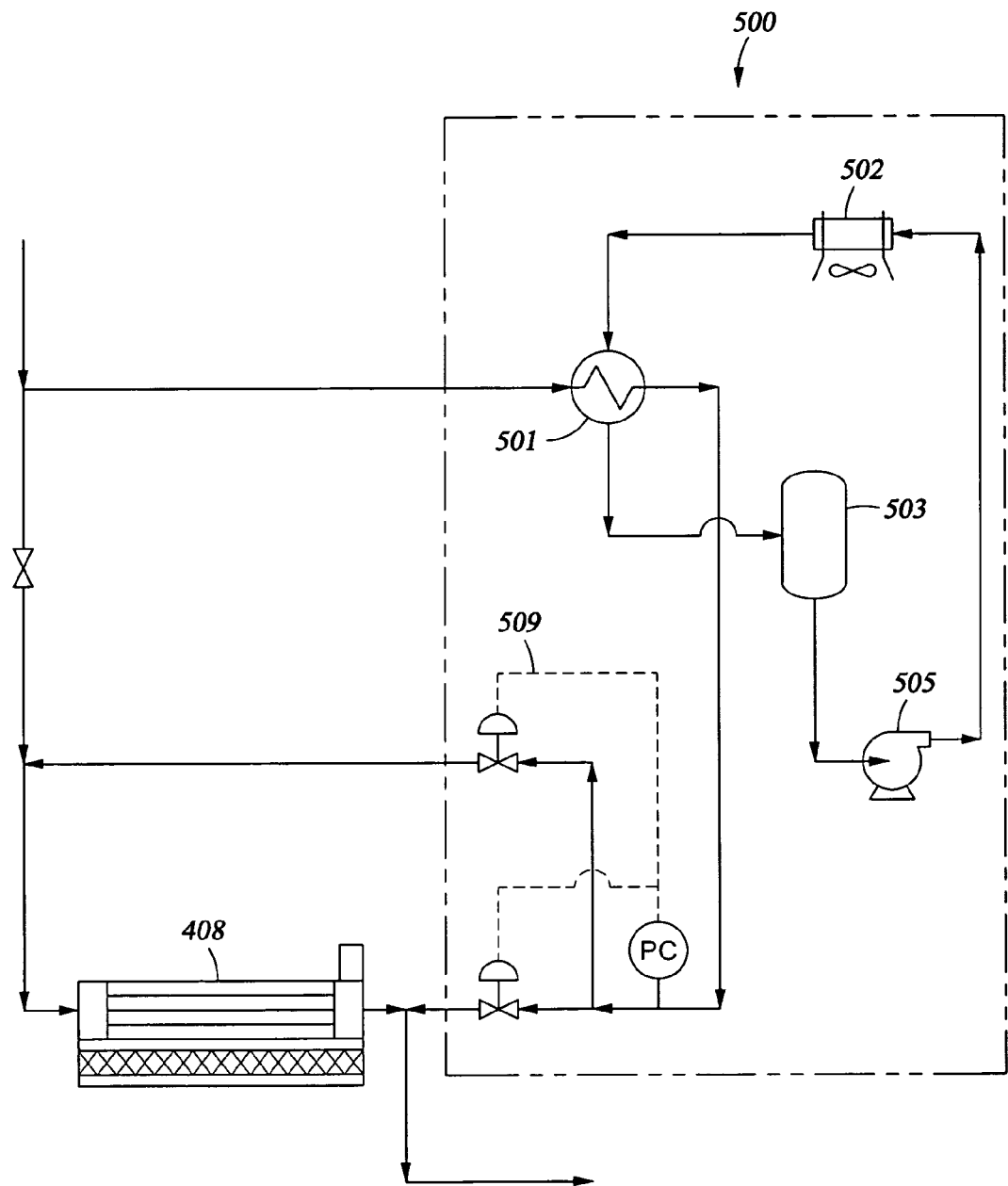
FIG. 5 is a schematic showing a retrofit of a water bath or submerged combustion system.

FIG. 5 is a schematic showing the retrofit of a water bath or submerged combustion vaporizer by the addition of system 500 as described above.

It should be understood that any of the above systems may incorporate process controls/methods as are known to those of skill in the art. For example, by-passes around any of the heat exchanges may be utilized. It should also be understood that much of the micro engineering/process detail is not shown in the above illustrations but would be well within the knowledge and understanding of those of skill in the art.

EXAMPLES

The following non-limiting examples are provided merely to illustrate a few embodiments of the present invention, and there examples are not meant to and do not limit the scope of the claims of the present invention. These inventions are theoretical calculated examples.

Example 1

This example utilizes the apparatus and method as shown in FIG. 1 (11@−10 F, 31@50 F, 32@−10 F, and 119 at 16 psi). The cryogenic fluid is a typical LNG. The circulating fluid utilized is propane. The duty percentage for the air cooler 101, and the combined duty percentage for fired heater 105 and economizer 103 were calculated for ambient air temperatures of 35 F, 45 F, 65 F, 70 F and 85 F, with these percentages presented in the following TABLE 1. The propane circulation is about 1.7 lb propane/lb LNG, with the rate depending upon the temperature and pressure of the LNG and propane. The propane circulation range is estimated to be from about 1.0 to 2.5 lb propane/lb LNG.

TABLE 1

Duty Percentage at Various Ambient Air Temperatures

| | 85 F. | 70 F. | 65 F. | 45 F. | 35 F. |
|---|---|---|---|---|---|
| Air Cooler | 100 | 100 | 95 | 70 | 58 |
| Fired Heat/Economizer | 0 | 0 | 5 | 30 | 42 |
| Total | 100 | 100 | 100 | 100 | 100 |

Example 2

This example also utilizes the apparatus and method as shown in FIG. 1 (11@−10 F, 31@50 F, 32@−10 F, and 119 at 100 psig). The cryogenic fluid is again a typical LNG. The circulating fluid utilized is propane. The duty percentage for the air cooler 101, and the combined duty percentage for fired heater 105 and economizer 103 were calculated for ambient air temperatures of 35 F, 45 F, 65 F, 70 F and 85 F, with these percentages presented in the following TABLE 2. The propane circulation is about 7.6 lb propane/lb LNG, with the rate depending upon the temperature and pressure of the LNG and propane. The propane circulation range is estimated to be from about 5.0 to 10.0 lb propane/lb LNG.

TABLE 2

Duty Percentage at Various Ambient Air Temperatures

| | 85 F. | 70 F. | 65 F. | 45 F. | 35 F. |
|---|---|---|---|---|---|
| Air Cooler | 100 | 100 | 93 | 57 | 47 |
| Fired Heat/Economizer | 0 | 0 | 7 | 43 | 53 |
| Total | 100 | 100 | 100 | 100 | 100 |

Example 3

This example again utilizes the apparatus and method as shown in FIG. 1 (11@range of −10 F to 30 F, 30@−10 F, 31@50 F, 32@30 F, and 119 at 16 psig). The cryogenic fluid is a typical LNG. Rather than using propane as the circulating fluid, WBF is utilized. As with Examples 1 and 2, the duty percentage for the air cooler 101, and the combined duty percentage for fired heater 105 and economizer 103 were calculated for ambient air temperatures of 35 F, 45 F, 65 F, 70 F and 85 F, with these percentages presented in the following TABLE 3. The WBF circulation is about 10–30 lb WBF/lb LNG, with the rate depending upon the temperature and pressure of the LNG and propane.

TABLE 3

Duty Percentage at Various Ambient Air Temperatures

| | 85 F. | 70 F. | 65 F. | 45 F. | 35 F. |
|---|---|---|---|---|---|
| Air Cooler | 100 | 100 | 93 | 60 | 51 |
| Fired Heat/Economizer | 0 | 0 | 7 | 40 | 49 |
| Total | 100 | 100 | 100 | 100 | 100 |

Example 4

Figure 2:
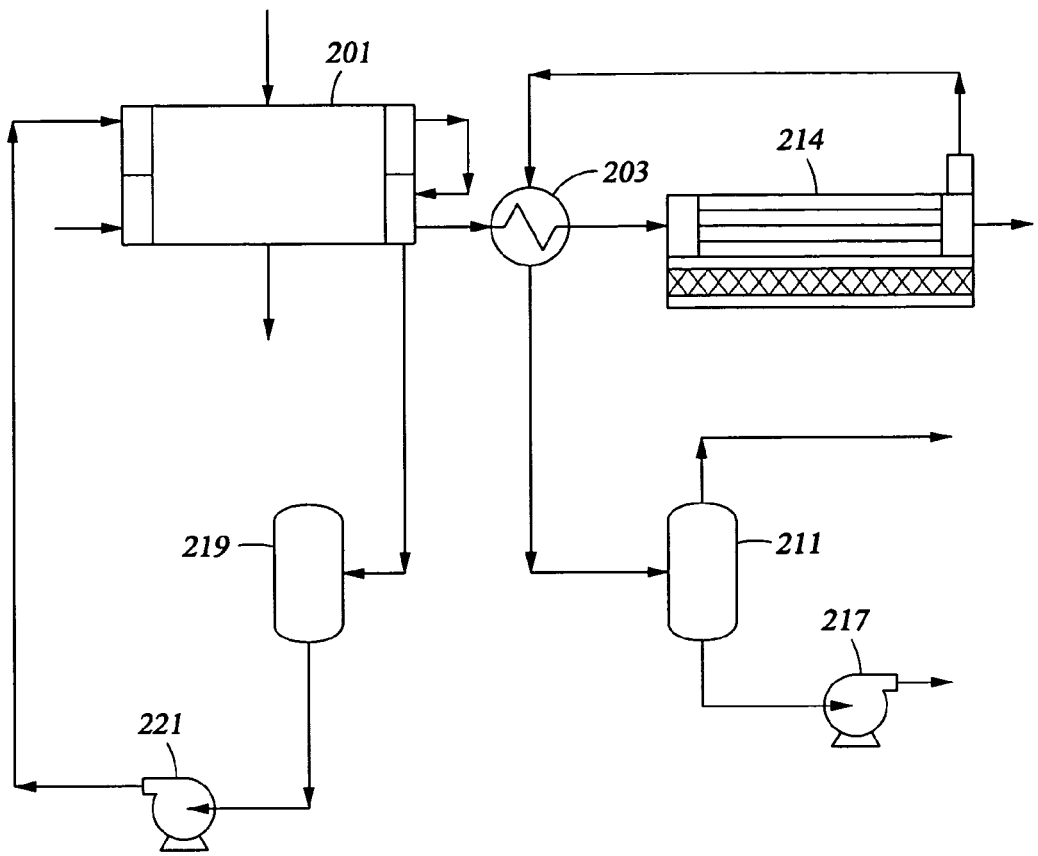
FIG. 2 is a process flow schematic showing regasification system 200 having tube-in-tube air exchanger 201, economizer 203, vaporizer 214, produced water knockout 211, produced water pump 217, warming medium accumulator 219 and warming medium pump 221.

This example utilizes the apparatus and method as shown in FIG. 2. The cryogenic fluid is a typical LNG. The warming medium utilized is propane. The duty percentage for the tube-in-tube air exchange 201, and the combined duty percentage for fired heater 214 and economizer 203 were calculated for ambient air temperatures of 35 F, 45 F, 65 F, 70 F and 85 F, with these percentages presented in the following TABLE 4. The economizer is used with the Water Bath Heater only.

TABLE 4

Duty Percentage at Various Ambient Air Temperatures

| | 85 F. | 70 F. | 65 F. | 45 F. | 35 F. |
|---|---|---|---|---|---|
| Air Cooler | 100 | 100 | 93 | 57 | 47 |
| Fired Heat/Economizer | 0 | 0 | 5 | 43 | 53 |
| Total | 100 | 100 | 100 | 100 | 100 |

Example 5

Potential savings utilizing present invention.

Basis: 1000 MMBtu/Hr; Air exchanger designed assuming 70 F; $5.00/MMBtu; 365 days of operation/yr.

|  | Month: | | | | | | | | | | | |
|---|---|---|---|---|---|---|---|---|---|---|---|---|
|  | Jan | Feb | Mar | Apr | May | Jun | Jul | Aug | Sep | Oct | Nov | Dec |
| T (F.): | 51 | 54 | 61 | 67 | 75 | 81 | 82 | 83 | 79 | 70 | 61 | 55 |
| AIR Htr % Duty: | 77.5 | 81 | 90 | 94 | 100 | 100 | 100 | 100 | 100 | 100 | 90 | 80 |
| Air Duty (MMBtu/Hr): | 775 | 810 | 900 | 940 | 1000 | 1000 | 1000 | 1000 | 1000 | 1000 | 900 | 800 |

Average Yearly Savings: 927.1×$5×24×365=$40.6 MM/Yr.

The above calculations are based on approximately 1500 MMSCFD being vaporized.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method of vaporizing a cryogenic fluid, the method comprising the steps of:
    providing heat from ambient air to a heat transfer fluid, by circulating the heat transfer fluid in a closed loop thru tubes of an air-cooled heat exchanger, and by directing ambient air downwardly across the tubes wherein the ambient air and heat transfer fluid are not in direct contact;
    providing heat from the heat transfer fluid to a cryogenic fluid sufficient to vaporize the cryogenic fluid
    wherein, the method is carried out under conditions which do not require defrosting.

2. The method of claim 1, wherein the cryogenic fluid is LNG.

3. An apparatus for vaporizing a cryogenic fluid, comprising:
    a heat transfer fluid closed circulation loop defined by an ambient air heat exchanger, a heater and a vaporizer, wherein the exchanger is configured to direct ambient air downward thru a tube bundle; and
    an LNG flow path defined thru the vaporizer
    wherein, the apparatus operates under conditions which do not require defrosting.

4. A method of modifying a vaporizing system in which a heat transfer fluid is circulated in a closed loop thru a heater to heat up the fluid and then circulated thru a vaporizer to vaporize the cryogenic fluid, the method comprises addition of a ambient air heat exchanger to provide heat to the heat exchange fluid, wherein the exchanger is configured to direct ambient air downward thru a tube bundle
    wherein, the method is carried out under conditions which do not require defrosting.

5. A modified system for vaporizing a cryogenic fluid comprising a heat transfer fluid heater and vaporizer, and comprising an ambient air heat exchanger added after the heat transfer fluid heater and vaporizer have been in operation in the system, wherein the exchanger is configured to direct ambient air downward thru a tube bundle
    wherein, the system operates out under conditions which do not require defrosting.

6. A method of vaporizing a cryogenic fluid, the method comprising the steps of:
    providing heat from ambient air to a heat transfer fluid, wherein the ambient air and heat transfer fluid are not in direct contact, wherein the heat transfer fluid is circulating in a closed loop in which the low temperature for the heat transfer fluid is in the range of about −10F to about 30F;
    providing heat from the heat transfer fluid to a cryogenic fluid sufficient to vaporize the cryogenic fluid
    wherein, the process is carried out under conditions which do not require defrosting.

7. The method of claim 6, wherein the cryogenic fluid is LNG.

* * * * *